(12) United States Patent
Gordon (10) Patent No.: US 9,403,252 B2
(45) Date of Patent: Aug. 2, 2016

(54) VISE SQUARE DEVICE AND METHOD OF USE

(71) Applicant: Sean Edward Gordon, Tucson, AZ (US)

(72) Inventor: Sean Edward Gordon, Tucson, AZ (US)

( * ) Notice: Subject to any disclaimer, the term of this patent is extended or adjusted under 35 U.S.C. 154(b) by 146 days.

(21) Appl. No.: 14/308,319

(22) Filed: Jun. 18, 2014

(65) Prior Publication Data

US 2015/0367465 A1    Dec. 24, 2015

(51) Int. Cl.
*B23Q 3/18*    (2006.01)
*B23Q 3/06*    (2006.01)
*B23Q 3/10*    (2006.01)
*B23Q 17/22*   (2006.01)

(52) U.S. Cl.
CPC ............... *B23Q 3/186* (2013.01); *B23Q 3/066* (2013.01); *B23Q 3/102* (2013.01); *B23Q 17/22* (2013.01); *Y10T 29/4978* (2015.01); *Y10T 409/309016* (2015.01)

(58) Field of Classification Search
CPC ............ B25B 1/12; B25B 1/14; B25B 13/26; B25B 13/40; B25B 5/12; B25B 5/122; B25B 7/12
See application file for complete search history.

(56) References Cited

U.S. PATENT DOCUMENTS

| 5,005,813 | A * | 4/1991 | Lawrence | B25B 5/006 269/236 |
| 5,056,766 | A * | 10/1991 | Engibarov | B25B 5/08 269/101 |
| 6,065,744 | A * | 5/2000 | Lawrence | B23Q 3/104 269/268 |
| 6,092,271 | A * | 7/2000 | Stojkovic | B25B 27/00 269/8 |
| 7,618,029 | B2 * | 11/2009 | Haley | B23K 3/087 269/3 |
| 8,047,494 | B2 * | 11/2011 | Chang | B25B 9/00 248/316.1 |
| 2012/0043711 | A1 * | 2/2012 | Schmidt | B25B 1/103 269/136 |
| 2015/0367465 | A1 * | 12/2015 | Gordon | B23Q 3/103 409/225 |

* cited by examiner

*Primary Examiner* — Lee D Wilson
(74) *Attorney, Agent, or Firm* — Lyman Moulton, Esq.

(57) ABSTRACT

A milling machine table device comprises a rigid longitudinal body having longitudinal surfaces parallel to each other along a length of the body configured to be attachable to a vise; and two rigid legs of equal length extending from the longitudinal body in a fixed position, each leg comprising a portion configured to engage a t-slot of the milling machine table there beneath. Also, a milling machine table device comprises two legs of equal length extending from the longitudinal body, each leg configured with a portion configured to engage a t-slot of the milling machine table and indicators disposed in one of the body and the two legs, the indicators comprising an adjustable probe configured to indicate an orthogonal distance from one of a vise jaw and an edge of a t-slot to an end of the probe. A method for calibrating and squaring the device is also included herein.

19 Claims, 11 Drawing Sheets

VISE SQUARE DEVICE AND METHOD OF USE

BACKGROUND AND FIELD OF INVENTION

A common task in the machine shop is to install a vise on a milling machine table to hold a work piece to be machined. It is necessary for the jaws of the vise to be exactly parallel to the movement of the milling machine table. If a parallelism is not achieved the work piece made on the milling machine will not have surfaces that are square to one another. Therefore, before a milling machine operation is performed, a milling machine table vise must be properly positioned relative to the movement of the milling machine table. If not, the milling machine operation results on the work piece are unpredictable.

There is therefore a long felt need in the milling machine market for a simple and reliable device and method which allow repetitious and consistent placement of a vise to the movement of the milling machine table. Machinists have long needed such a vise squaring device and method of use which allows a work piece in the vise to be accurately and predictably machined on all surfaces.

SUMMARY OF THE INVENTION

A milling machine table vise square device comprises a rigid longitudinal body having longitudinal surfaces parallel to each other along a length of the body configured to be attachable or adjacent to a vise. The device also includes two rigid legs of equal length extending from the longitudinal body in a fixed position, each leg configured with an ankle portion which may be disposed on a top surface of the milling machine table. Each leg is also configured with a t-shoe or an extension or portion to engage a surface on the milling machine known to be parallel to the longitudinal travel of the milling machine table such as a t-slot of the milling machine table there beneath. The two legs of equal length which extend from the longitudinal body may also comprise an indicator. Each indicator comprises an adjustable probe tip configured to indicate an orthogonal distance from an edge of a surface on the milling machine known to be parallel to the longitudinal travel of the milling machine table such as a t-slot of the milling machine table there beneath to an end or tip of the probe.

A method is disclosed for adjusting a vise to t-slots in a milling machine table via a vise squaring device. The method comprises providing a rigid longitudinal body having longitudinal surfaces parallel to each other along a length of the body attachable or clampable or otherwise adjacently disposed in the vise. The method also includes providing two legs of equal length of the device extending from the longitudinal body, each leg configured with an indicator which may rest or be disposed on a top surface of the milling machine table and calibrating an indicator probe of the device to indicate a normalized distance from an end tip of each indicator probe to an independent surface. Embodiments of the method may further comprise squaring the vise to the milling machine table via adjusting the probe of each indicator to read a same distance from the probe's end to a longitudinal edge of the t-slot via a right angle probe extension.

Other aspects and advantages of embodiments of the disclosure will become apparent from the following detailed description, taken in conjunction with the accompanying drawings, illustrated by way of example of the principles of the disclosure.

Throughout the description, similar and same reference numbers may be used to identify similar and same elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The term 'longitudinally' as used throughout the present disclosure defines a lengthwise dimension or a longer distinguishing dimension. Therefore, longitudinal surfaces parallel to each other along a length of the body of the device comprise cylindrical surfaces and flat surfaces. In other words, parallel surfaces may be defined by two points on a cylinder along a diameter of the cylinder. Parallel surfaces may also be defined as two flat surfaces on the face of a cylinder or on the face of flat stock. All dimensions specified herein include a plus or minus ten percent tolerance for manufacturing and vendor interchangeability.

Figure 1:
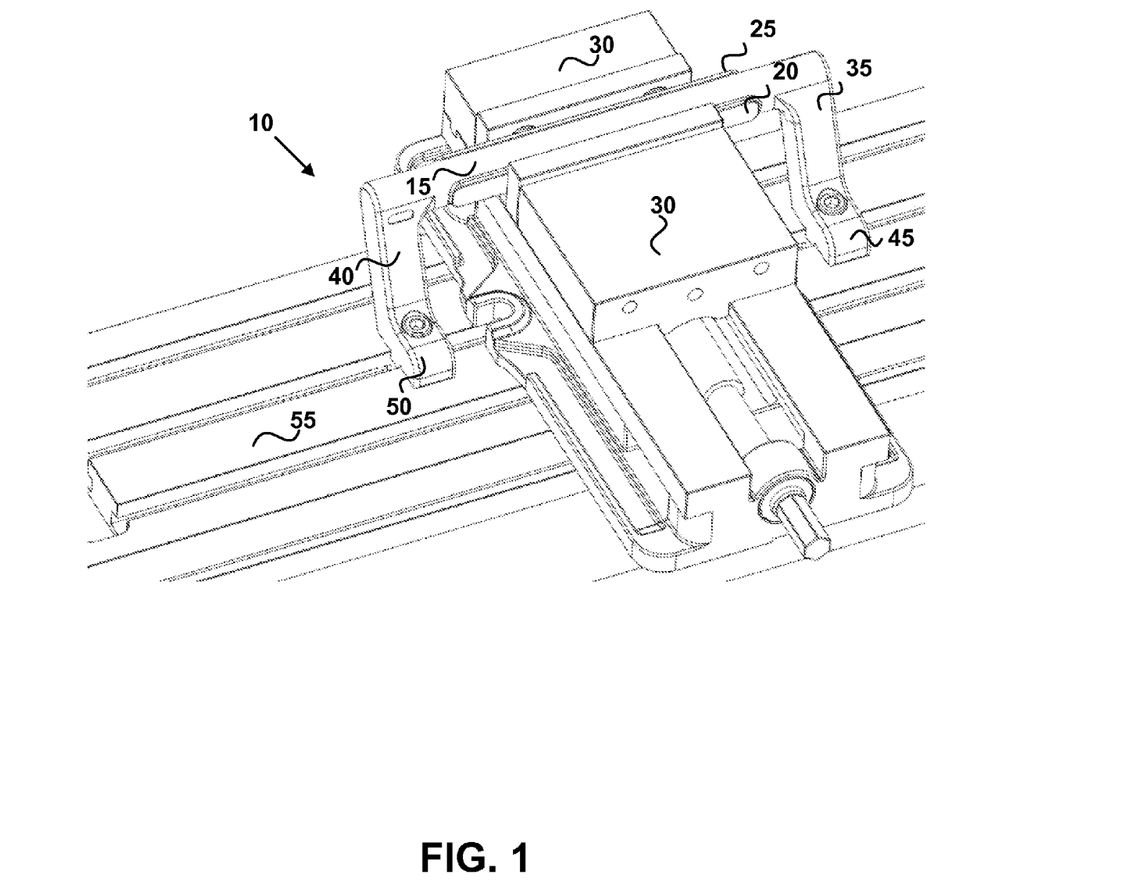
FIG. 1 is a top perspective view of a vise square device in vise jaws and a t-slot of a milling machine table in accordance with an embodiment of the present disclosure.

FIG. 1 is a top perspective view of a vise square device in vise jaws and a t-slot of a milling machine table in accordance with an embodiment of the present disclosure. A milling machine table vise square device 10 comprises a rigid longitudinal body 15 having longitudinal surfaces 20 and 25 parallel to each other along a length of the body 15 configured to be attachable, clampable in a vise 30 or otherwise adjacent to the vise jaws thereof. Two rigid legs 35 and 40 of equal length extend from the longitudinal body 15 in a fixed position, each leg configured with an ankle portion 45 and 50 which may lay adjacent a top surface of the milling machine table 55. Each leg may be configured with a t-shoe (not depicted) or an extension or portion thereof configured to engage a t-slot of the milling machine table there beneath such as a ring, a pin or other geometry smaller than the t-slot.

An embodiment of the milling machine table vise square device comprises a leg connection extending from an end of one leg to an end of the other leg. The leg connection is configured to be parallel to the body of the device and to engage a surface on the milling machine known to be parallel to the longitudinal travel of the milling machine table. The leg connection fits under the vise and may therefore sit in a t-slot or may be adjacent any other surface parallel to the longitudinal travel of the milling machine table.

Figure 2:
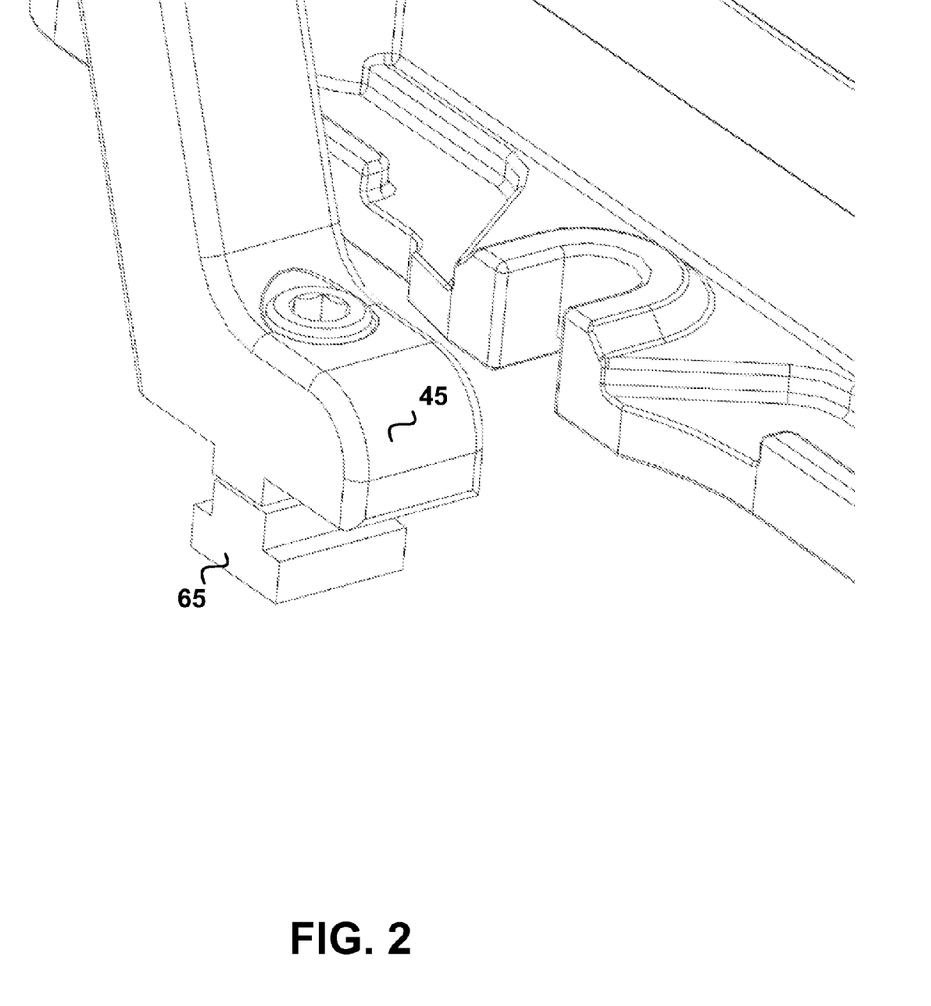
FIG. 2 is a detail view of the vise square device depicting the ankle portion and the t-shoe in a t-slot of a milling machine table in accordance with an embodiment of the present disclosure.

FIG. 2 is a detail view of the vise square device depicting the ankle portion and the t-shoe in a t-slot of a milling machine table in accordance with an embodiment of the present disclosure. The t-shoe 65 is shown engaged with a t-slot in the milling machine table. The t-shoe and the t-slot are complementary geometries. An embodiment of the milling machine table device 10 further comprises a tightening mechanism configured to tighten and secure the t-shoe to the ankle portion and secure the device in the t-slot of the milling machine table. At least one magnet may be disposed on one of the ankle portion and the t-shoe of the device, the magnet configured to tighten and secure the t-shoe to the ankle portion and secure the device in the t-slot of the milling machine table.

Embodiments of the disclosed milling machine table device further comprise at least one magnet disposed on the body of the device, the magnet configured to secure the longitudinal body of the device parallel to a clamping edge of the vise. An equal length of each leg extends from the body to the ankle portion to enable the body to be secured in a milling table vise and the legs to be adjacent atop the milling machine table at the ankle portion thereof. The parallel surfaces length of the body enables clamping the body in a milling machine table vice. An angle between the body to one leg is equivalent to an angle between the body to another leg to enable a square frame between the milling machine table, each leg and the body. The t-shoe of each leg is detachable from the ankle portion of each leg via an adjusting set screw extending from the ankle portion into the t-shoe. The parallel surfaces length of the body measures a nominal 274.83 mm (10.820 inches) to enable clamping the body in a milling machine table vice and each leg extends a nominal 80.00 mm (3.150 inches) from the body to an ankle portion to enable the body to be secured in a milling table vise and the legs to rest atop the milling machine table at the ankle portion thereof. All measurements may vary by plus or minus 10% for manufacturing tolerances.

Figure 3:
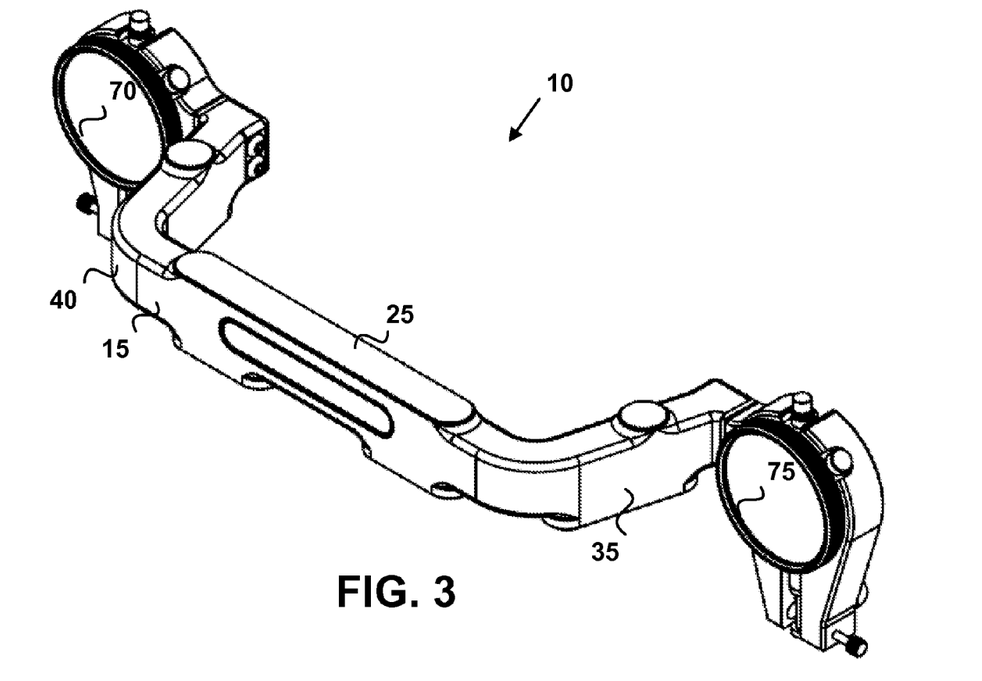
FIG. 3 is a side perspective view of a vise square device with multiple indicators in accordance with an embodiment of the present disclosure.

FIG. 3 is a side perspective view of a vise square device with multiple indicators in accordance with an embodiment of the present disclosure. Reference numbers depicted may be the same for same or similar features and limitations of other figures disclosed herein. The surface 25 is clampable in a milling table vise but a cylindrical surface is also clampable in the vise. Surface 25 facilitates fast, easy and predictable clamping.

Figure 4:
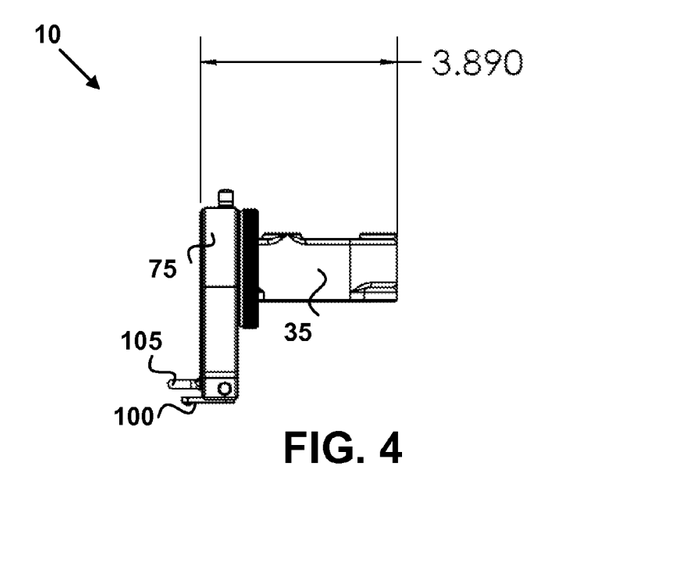
FIG. 4 is an end elevational view of a vise square device depicting a device leg, an indicator, an extension and a t-slot runner in accordance with an embodiment of the present disclosure.

FIG. 4 is an end elevational view of a vise square device depicting a device leg, an indicator, an extension and a t-slot runner in accordance with an embodiment of the present disclosure. Reference numbers depicted may be the same for same or similar features and limitations of other figures disclosed herein. The extension 105 at the end of a probe tip may be disposed against an edge of a t-slot to indicate distance from one leg to a vise jaw. The runner 105 provides mechanical protection for the extension 100 and may 'run' back and forth in the t-slot parallel to the movement of the milling machine table.

Figure 5:
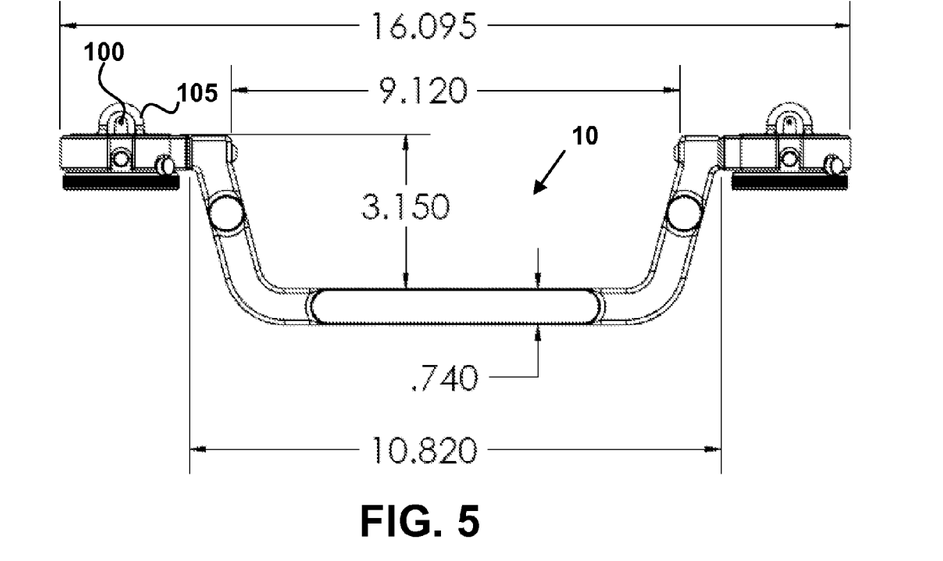
FIG. 5 is a side elevational view of a vise square device depicting the body, two legs, two indicators with extensions and runners in accordance with an embodiment of the present disclosure.

FIG. 5 is a side elevational view of a vise square device depicting the body, two legs, two indicators with extensions and runners in accordance with an embodiment of the present disclosure. The extension 100 and the runner 105 are shown protruding from the backside of both indicators. The runner 105 provides mechanical protection for the extension 100 while allowing the extension 100 to abut an edge of a t-slot. An inside measurement of the body 15 to an outside of a leg is nominally 3.150 inches. An outside length of the vise square device sans the indicators measures a nominal 10.820 inches and an inside length measures 9.120 inches. There is a manufacturing tolerance of plus or minus 10% on all dimensions depicted. An overall length of the vise square device including the indicators measures 16.095 inches. A side width of the vise square device body measures 0.740 inches.

Figure 6:
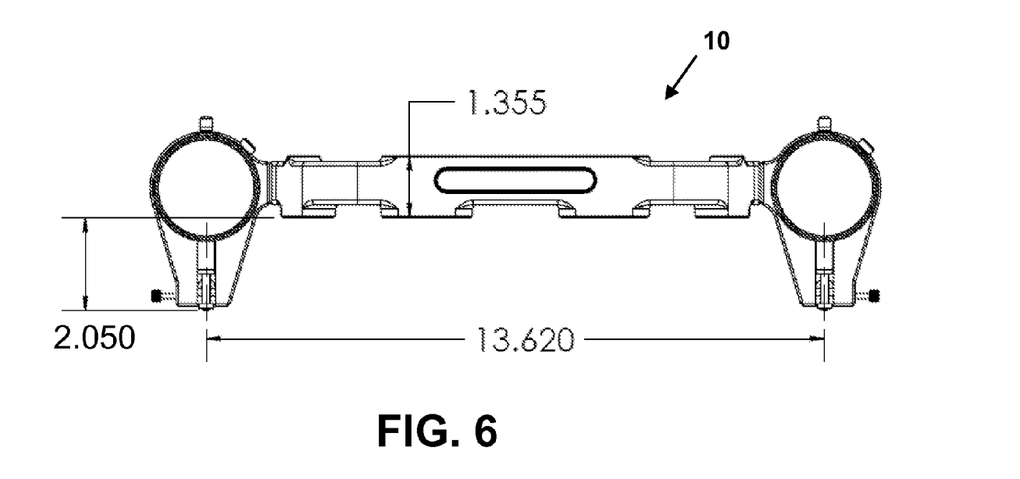
FIG. 6 is a top elevational view of a vise square device depicting device dimensions in accordance with an embodiment of the present disclosure.

FIG. 6 is a top elevational view of a vise square device depicting device dimensions in accordance with an embodiment of the present disclosure. Reference numbers depicted may be the same for same or similar features and limitations of other figures disclosed herein. A top width of the vise square device measures 1.355 inches and is the dimension of the body 15 which may be clampable in the milling machine vise jaws. A distance between probe tips measures a nominal 13.620 inches. A probe extension from an inside of the body 15 measures 2.050. All measurements include a manufacturing tolerance of plus or minus 10%.

Figure 7:
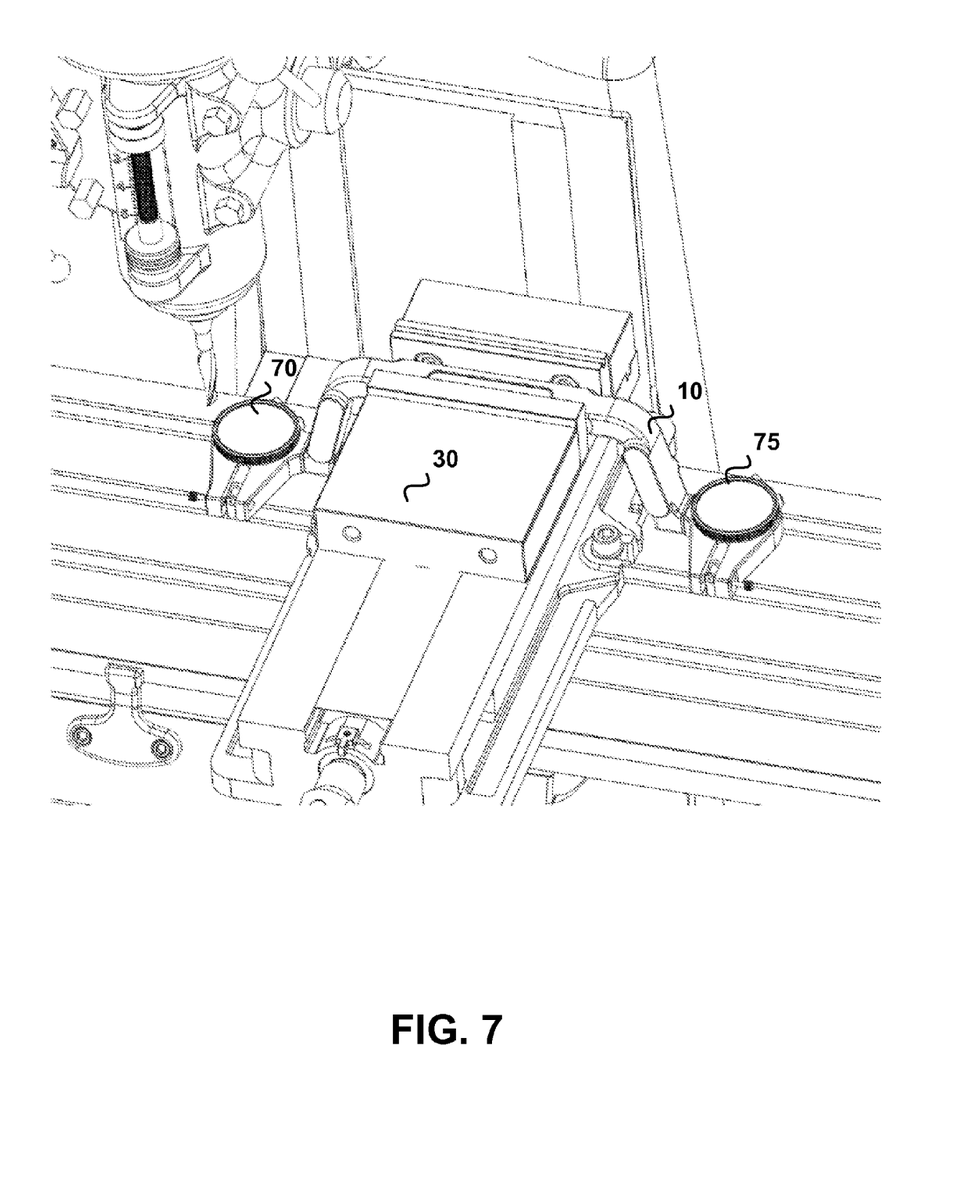
FIG. 7 is a perspective view of a milling machine table, a vise attached thereon and a vise square device having multiple indicators in accordance with an embodiment of the present disclosure.

FIG. 7 is a perspective view of a milling machine table, a vise attached thereon and a vise square device having multiple indicators in accordance with an embodiment of the present disclosure. A milling machine table device comprises a rigid longitudinal body having longitudinal surfaces parallel to each other along a length of the body configured to be attachable or clampable in a vise. Two legs of equal length extend from the longitudinal body. Each leg is configured with an indicator 70 and 75 which may rest or be disposed on a top surface of the milling machine table. Each indicator 70 and 75 comprises an adjustable probe 80 and 85 configured between two indicator arms 90 and 95 of equal length to indicate an orthogonal distance from an edge of a t-slot of the milling machine table there beneath to an end tip of the probe.

Figure 8:
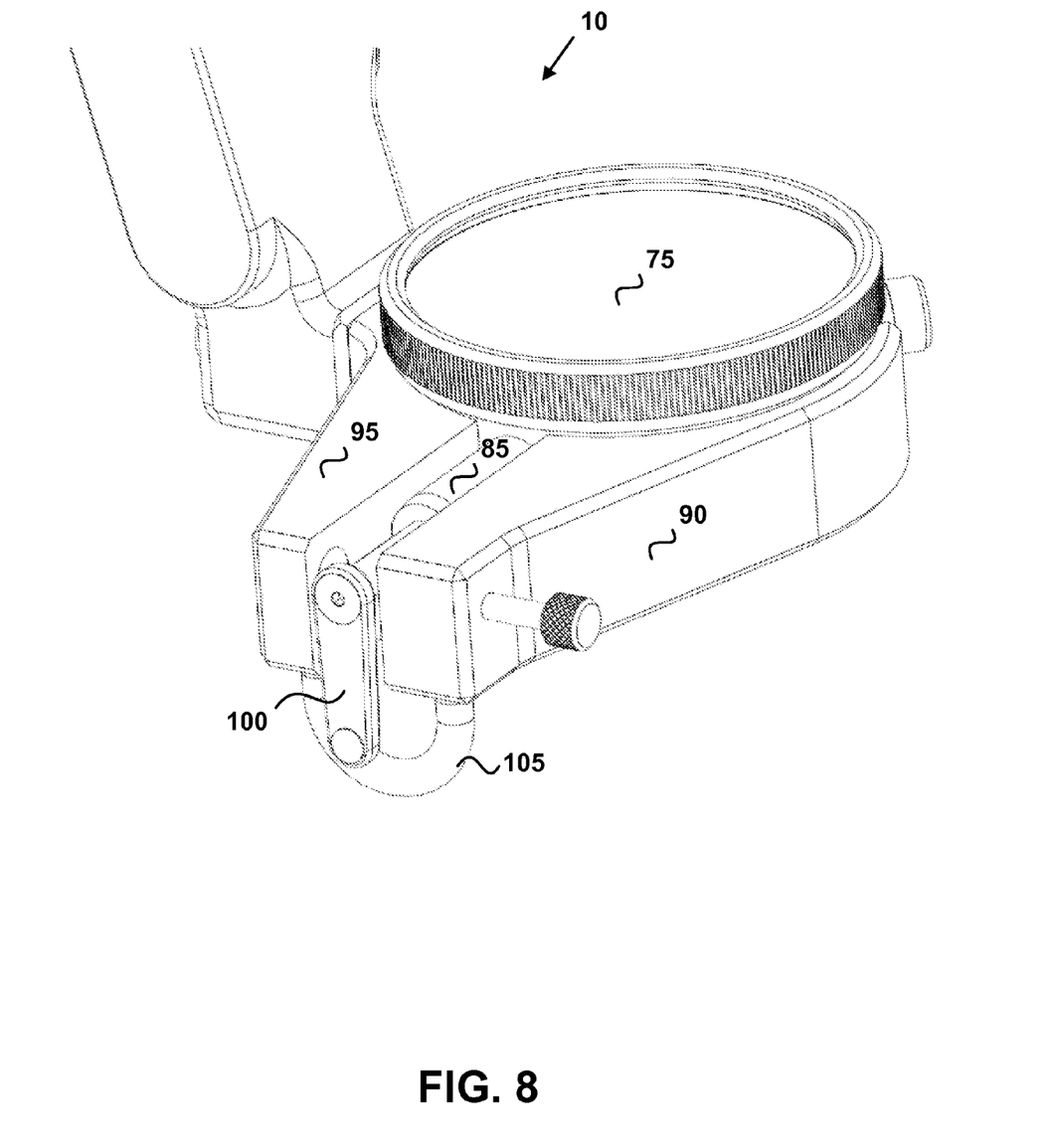
FIG. 8 is a close up view of the vise and the vise square device attached on the milling machine table in accordance with an embodiment of the present disclosure.

FIG. 8 is a close up view of the vise and the vise square device attached on the milling machine table in accordance with an embodiment of the present disclosure. Another embodiment of the disclosed milling machine table device further comprises a right angle extension 100 disposed at an end tip of the probe 85, the right angle extension 100 configured to engage a longitudinal edge of a t-slot there beneath. An indicator further comprises a runner 105 extending from one indicator arm to another indicator arm, the runner 105 configured to slide along a trough of a t-slot in the milling machine table.

In an embodiment, a tightening mechanism is configured to tighten and secure a portion of the indicator to the t-slot of the milling machine table. At least one magnet may be disposed on each indicator, the magnet configured to tighten and secure the device in the t-slot of the milling machine table. At least one magnet may be disposed on the body of the device, the magnet configured to secure the longitudinal body of the device parallel to a vise jaw fixed on the milling machine table. A readable face of each indicator is configured orthogonal to the longitudinal and parallel surfaces of the body to enable reading the indicators with the body clamped in the vise.

Figure 9:
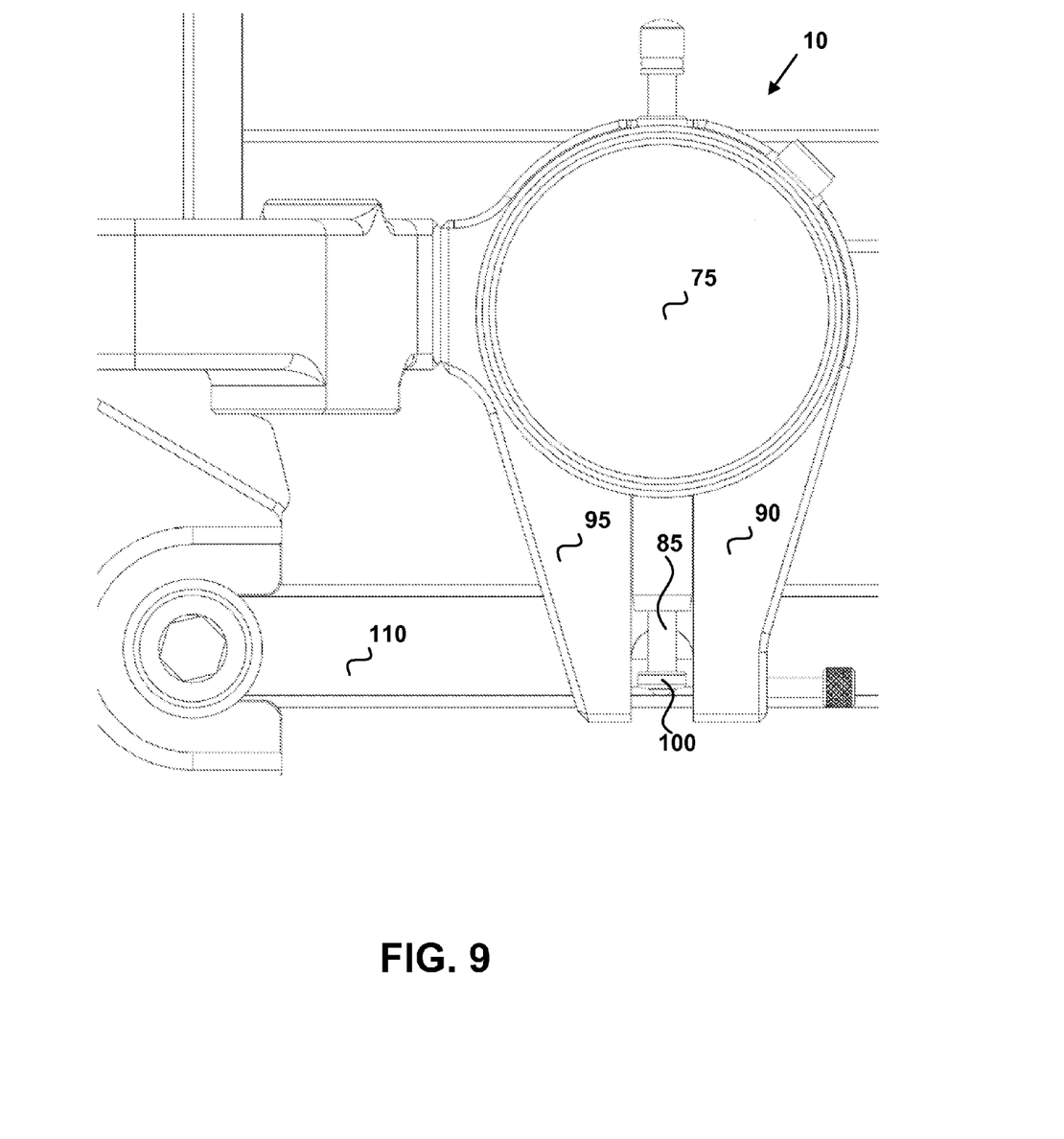
FIG. 9 is a top perspective close up view of an indicator probe and extension in accordance with an embodiment of the present disclosure.

FIG. 9 is a top perspective close up view of an indicator probe and extension in accordance with an embodiment of the present disclosure. Depicted are the two rigid arms 90 and 95 and the probe 85 and the indicator face 75 and the right angle extension 100. T-slot 110 provides a surface of the milling machine table known to be parallel to the longitudinal travel of the milling machine table. The extension 100 therefore contacts an edge of the t-slot for each probe of each indicator 70 and 75. Also, the vise is attached to the milling machine table at the t-slots as shown by the vise fastener at the lower left hand corner of FIG. 5 in the t-slot 110.

Figure 10:
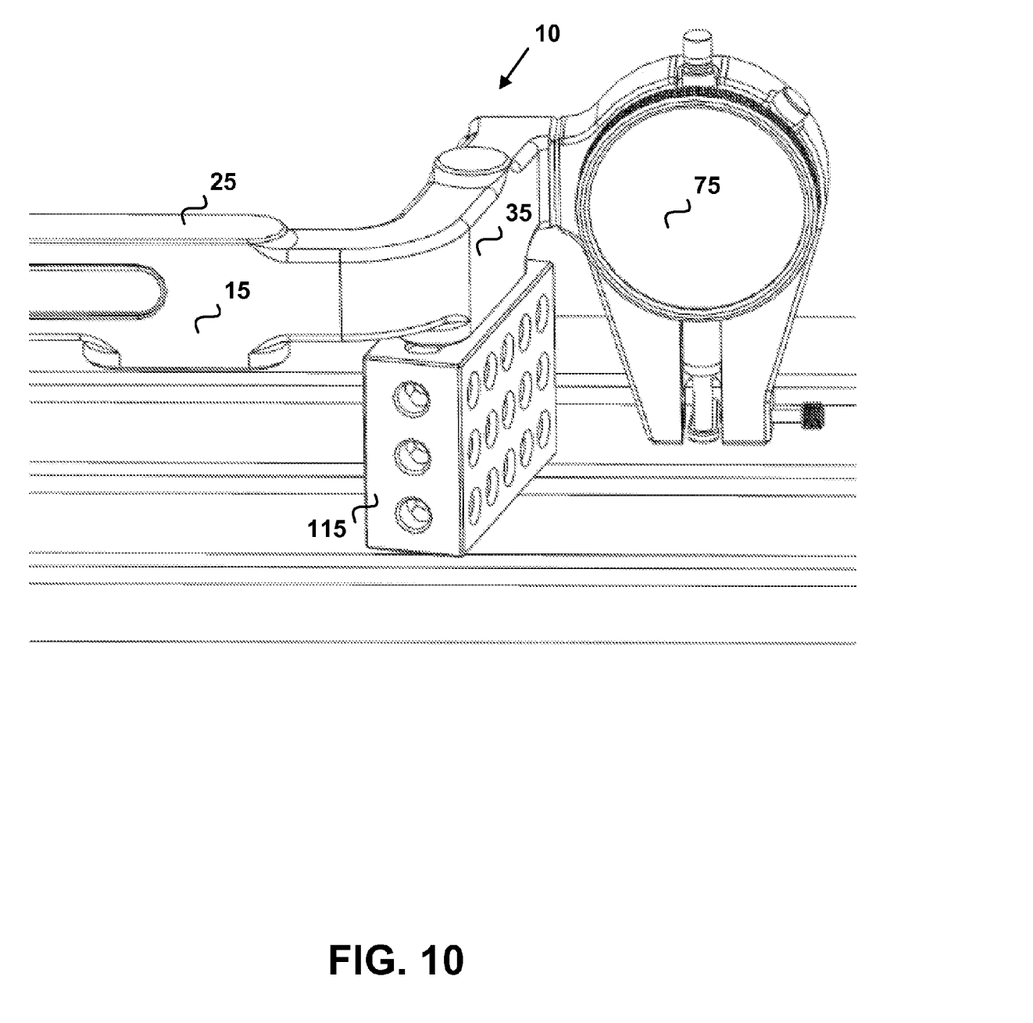
FIG. 10 is a perspective view of a vise square device in calibration mode in accordance with an embodiment of the present disclosure.

FIG. 10 is a perspective view of a vise square device in calibration mode in accordance with an embodiment of the present disclosure. Same and similar reference numbers may indicate same and similar device limitations common to other figures in the present disclosure. The vise square device 10 is rotated ninety degrees and the arms are supported by a common 1-2-3 block (one inch by two inches by three inches) 115 to enable the probe 85 to extend orthogonally to the milling machine table top 55. The indicator probe 85 may be extended until it touches the milling machine table top 55 and an indicator face 75 may be adjusted to read zero in order to calibrate the probe 85.

Figure 11:
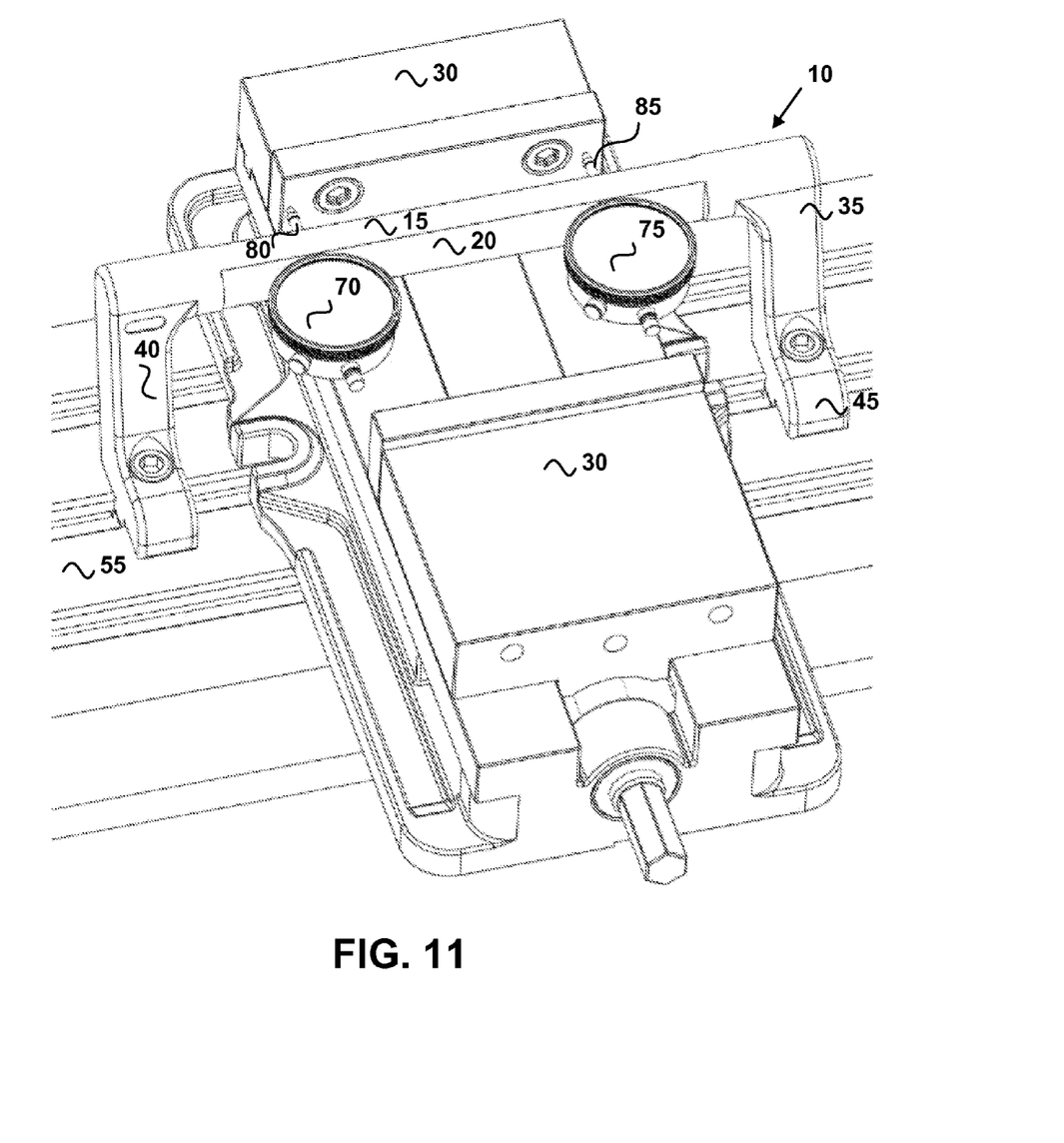
FIG. 11 is a perspective view of a vise square device configured to measure a distance from the device body to a vise jaw in accordance with an embodiment of the present disclosure.

FIG. 11 is a perspective view of a vise square device configured to measure a distance from the device body to a vise jaw in accordance with an embodiment of the present disclosure. A plurality of indicator probes are each configured to measure a distance from the body to a vise jaw, a difference of zero between any two indicator measurements being an indication of a square vise. The depicted configuration of the vise square device 10 within the vise jaws does not require the vise jaws to be clamped together. However, the depicted configuration does require that the probes 80 and 85 extend through the body 15 of the vise square device 10 and onto a surface of the vise jaws or any other surface parallel with the movement of the milling machine table 55. Reference numbers depicted are the same or similar to reference numbers used in other figures of the present disclosure.

Figure 12:
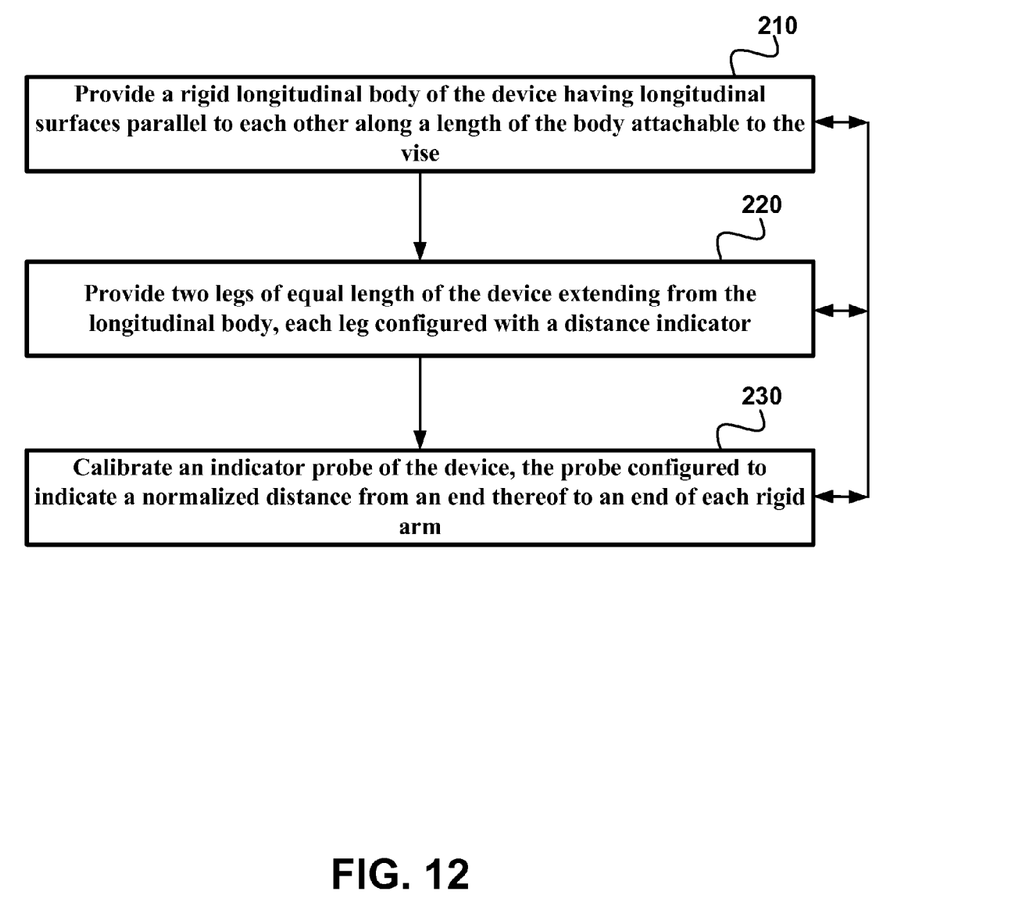
FIG. 12 is a block diagram of a method for adjusting a vise to t-slots in a milling machine table via the disclosed device and calibrating an indicator probe thereof in accordance with an embodiment of the present disclosure.

FIG. 12 is a block diagram of a method for adjusting a vise to t-slots in a milling machine table via the disclosed device and calibrating an indicator probe thereof in accordance with an embodiment of the present disclosure. The method comprises providing 210 a rigid longitudinal body of the device having longitudinal surfaces parallel to each other along a length of the body attachable or clampable in the vise. The method also includes providing 220 two legs of equal length of the device extending from the longitudinal body, each leg configured with a distance indicator which may be disposed on a top surface of the milling machine table. The method further includes calibrating 230 an indicator probe of the device configured between two rigid indicator arms of equal length, the probe configured to indicate a normalized distance from an end thereof to an independent surface. A normalized distance is read on the indicator face as zero by rotating the indicator face dial till it reads zero. Electronic and digital equivalent methods and devices may also be used to achieve a normalized reading.

Figure 13:
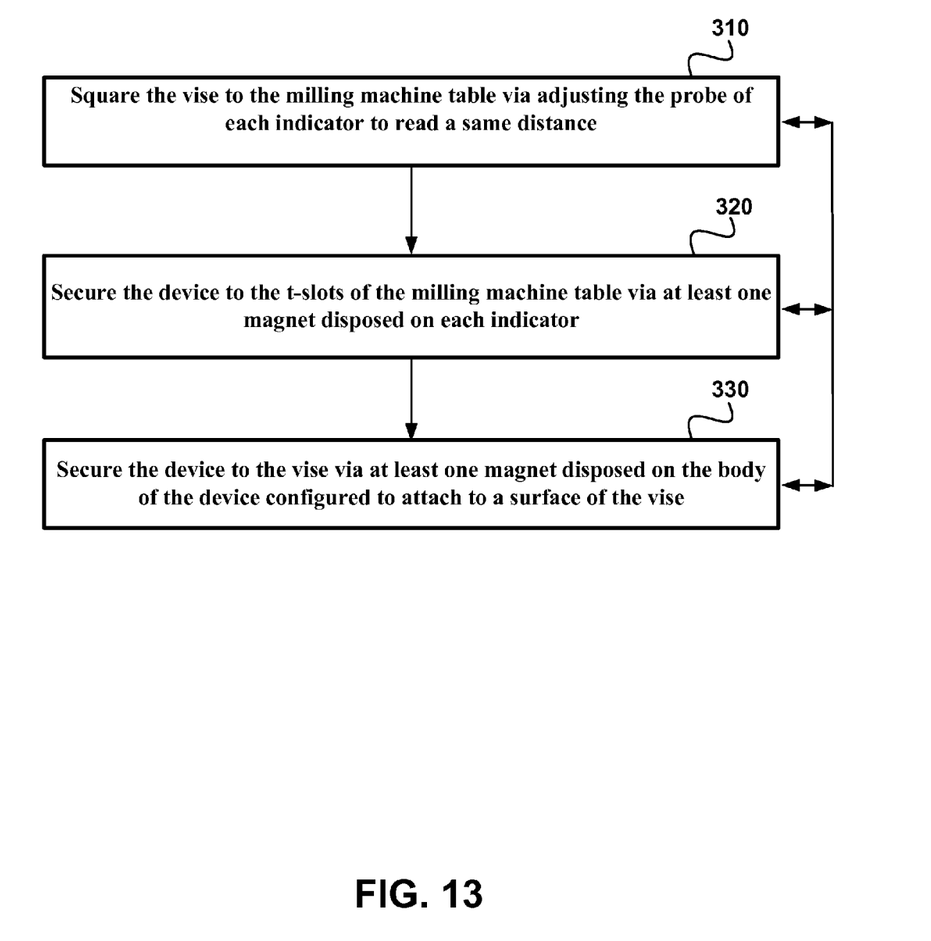
FIG. 13 is a block diagram of a method for attaching a vise square device to a vise and squaring the vise in accordance with an embodiment of the present disclosure.

FIG. 13 is a block diagram of a method for attaching a vise square device to a vise and squaring the vise in accordance with an embodiment of the present disclosure. Embodiments of the method may further comprise squaring 310 the vise to the milling machine table via adjusting the probe of each indicator to read a same distance from the probe's end to a longitudinal edge of the t-slot via a right angle probe extension. The disclosed method may also include securing 320 the device to the t-slots of the milling machine table via at least one magnet disposed on each indicator. The disclosed method may further include securing 330 the device to the vise via at least one magnet disposed on the body of the device to attach to a clamping edge of the vise.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A milling machine table device, comprising:
   a rigid longitudinal body having flat longitudinal surfaces parallel to each other along a length of the body configured to be clampable within a vise jaw; and
   two rigid legs of equal length, one of each extending from an end of the longitudinal body in a rigid fixed position, each leg comprising an ankle portion configured to extend from a respective leg end at an obtuse angle and engage a surface on the milling machine known to be parallel to the longitudinal travel of the milling machine table,
   wherein the body and the two legs and the respective ankle portions comprise a single rigid device configured to indicate a square orthogonal relation of the legs to a longitudinal travel of the milling machine table and a parallel relation of the body to the vise jaw.

2. The milling machine table device of claim 1, further comprising a tightening mechanism configured to tighten and secure a t-shoe of a leg to an upper ankle portion thereof and secure the device in a t-slot of the milling machine table.

3. The milling machine table device of claim 1, further comprising at least one magnet disposed on one of the ankle portion and the t-shoe of the device, the magnet configured to tighten and secure the t-shoe to the ankle portion and secure the device in the t-slot of the milling machine table.

4. The milling machine table device of claim 1, further comprising at least one magnet disposed on the body of the device, the magnet configured to secure the longitudinal body of the device parallel to a clamping edge of the vise.

5. The milling machine table device of claim 1, wherein the parallel surfaces length of the body measures a nominal 274.83 mm (10.820 inches) to enable clamping the body in a milling machine table vice and each leg extends a nominal 80.00 mm (3.150 inches) from the body to an ankle portion to enable the body to be secured in a milling table vise and the legs to rest atop the milling machine table at the ankle portion thereof.

6. The milling machine table device of claim 1, wherein an angle between the body to one leg is equivalent to an angle between the body to another leg to enable a square frame between the milling machine table, each leg and the body.

7. The milling machine table device of claim 1, wherein the t-shoe of each leg are detachable from the ankle portion of each leg via an adjusting set screw extending from the ankle portion into the t-shoe.

8. A milling machine table device, comprising:
a rigid longitudinal body having longitudinal surfaces parallel to each other along a length of the body configured to be adjacent to a vise;
two legs of equal length extending from the longitudinal body, each leg comprising a portion configured to engage a surface on the milling machine known to be parallel to the longitudinal travel of the milling machine table; and
a plurality of indicators disposed in one of the body and the two legs, the indicators comprising an adjustable probe configured to indicate an orthogonal distance from one of a vise jaw and a surface on the milling machine known to be parallel to the longitudinal travel of the milling machine table.

9. The milling machine table device of claim 8, wherein an indicator further comprises a right angle extension disposed at an end of the probe, the right angle extension configured to engage a longitudinal edge of a t-slot there beneath.

10. The milling machine table device of claim 8, wherein a plurality of indicator probes are each configured to measure a distance from the body to a vise jaw, a difference of zero between any two indicator measurements being an indication of a square vise.

11. The milling machine table device of claim 8, wherein an indicator further comprises a runner extending from one indicator arm to another indicator arm, the runner configured to slide along a trough of a t-slot in the milling machine table.

12. The milling machine table device of claim 8, further comprising a tightening mechanism configured to tighten and secure a portion of the indicator to the t-slot of the milling machine table.

13. The milling machine table device of claim 8, further comprising at least one magnet disposed on each indicator, the magnet configured to tighten and secure the device in the t-slot of the milling machine table.

14. The milling machine table device of claim 8, further comprising at least one magnet disposed on the body of the device, the magnet configured to secure the longitudinal body of the device parallel to a vise jaw fixed on the milling machine table.

15. The milling machine table device of claim 8, wherein a readable face of each indicator is configured orthogonal to the longitudinal surfaces of the body to enable reading the indicators with the body clamped in the vise.

16. A method for adjusting a vise to t-slots in a milling machine table via a device, the method comprising:
providing a rigid longitudinal body of the device having longitudinal surfaces parallel to each other along a length of the body attachable to the vise; and
providing two legs of equal length of the device extending from the longitudinal body, each leg configured with a distance indicator; and
calibrating an indicator probe of the device, the probe configured to indicate a normalized distance from an end thereof to an independent surface.

17. The method for adjusting a vise to t-slots in a milling machine table of claim 16, the method further comprising squaring the vise to the milling machine table via adjusting the probe of each indicator to read a same distance from the probe's end to a longitudinal edge of the t-slot via a right angle probe extension.

18. The method for squaring a vise to t-slots in a milling machine table of claim 16, further comprising securing the device to the t-slots of the milling machine table via at least one magnet disposed on each indicator.

19. The method for squaring a vise to t-slots in a milling machine table of claim 16, further comprising securing the device to the vise via at least one magnet disposed on the body of the device to attach to a surface of the vise.

* * * * *